(12) United States Patent
Heisey

(10) Patent No.: US 6,865,870 B2
(45) Date of Patent: Mar. 15, 2005

(54) COMBINE POWER SELECTION SYSTEM

(75) Inventor: Richard D. Heisey, Willowstreet, PA (US)

(73) Assignee: CNH America LLC, Racine, WI (US)

( * ) Notice: Subject to any disclaimer, the term of this patent is extended or adjusted under 35 U.S.C. 154(b) by 37 days.

(21) Appl. No.: 10/041,591

(22) Filed: Jan. 10, 2002

(65) Prior Publication Data

US 2003/0126845 A1 Jul. 10, 2003

(51) Int. Cl.[7] .......................... A01D 75/00; B60K 41/04
(52) U.S. Cl. ...................... 56/10.2 G; 701/50; 477/111
(58) Field of Search .............................. 56/101, 10.2 R, 56/10.2 G, 10.8, 10.9, 11.1, 11.9, 14.7, DIG. 15; 460/1, 6; 172/2, 3; 701/50; 477/107, 110, 111

(56) References Cited

U.S. PATENT DOCUMENTS

| | | | | |
|---|---|---|---|---|
| 4,487,002 A | * | 12/1984 | Kruse et al. ................... 460/6 |
| 4,648,040 A | * | 3/1987 | Cornell et al. ................ 701/52 |
| 4,663,713 A | * | 5/1987 | Cornell et al. ................ 701/52 |
| 4,663,714 A | * | 5/1987 | Cornell et al. ................ 701/52 |
| 4,953,427 A | * | 9/1990 | Ushiro ........................ 477/68 |
| 5,335,487 A | * | 8/1994 | Murakawa et al. .......... 56/10.8 |
| 5,406,483 A | * | 4/1995 | Kallis et al. .................. 701/53 |
| 5,488,817 A | * | 2/1996 | Paquet et al. ............. 56/10.2 R |
| 5,526,261 A | * | 6/1996 | Kallis et al. .................. 701/51 |
| 5,781,876 A | * | 7/1998 | Saur ............................ 701/93 |
| 5,995,895 A | * | 11/1999 | Watt et al. .................... 701/50 |
| 6,073,428 A | * | 6/2000 | Diekhans ................. 56/10.2 R |
| 6,098,004 A | * | 8/2000 | Grytzelius et al. ............ 701/55 |
| 6,149,546 A | * | 11/2000 | Tabata et al. ............... 477/125 |
| 6,247,295 B1 | * | 6/2001 | Hansen et al. ........... 56/10.2 A |
| 6,589,136 B2 | * | 7/2003 | Ephraim et al. ............ 477/111 |

* cited by examiner

Primary Examiner—Robert E. Pezzuto
Assistant Examiner—Nathan Mammen
(74) Attorney, Agent, or Firm—Brant T. Maurer; Rebecca Henkel

(57) ABSTRACT

A system for propelling a combine over the ground and driving other components of the combine includes an engine driving a transmission via a hydrostatic drive system. A microprocessor stores a work table and a road table for controlling engine speed. A gear selector operates a switch to select one of the tables and a throttle control operates switches to select a speed value from the selected table. When working a field, the work table is selected so that the engine runs at speeds in a range suitable for driving the other components. For transport of the combine the road table is selected so that the engine may run at a speed higher than speeds suitable for driving the other components. For a given setting of the throttle control, the engine is controlled to run at either a first or second speed depending on the setting of the gear select lever.

5 Claims, 3 Drawing Sheets

COMBINE POWER SELECTION SYSTEM

FIELD OF THE INVENTION

The present invention relates to an engine speed control system for a combine harvester having a hydrostatic wheel drive system for propelling the combine over the ground. More particularly, the invention provides for alternate engine speeds for a single setting of a throttle control member.

BACKGROUND OF THE INVENTION

Some combines employ a hydrostatic drive system wherein an internal combustion engine drives a hydrostatic pump. The pump drives a hydrostatic motor, the motor in turn driving the wheels of the combine through a transmission to propel the combine over the ground. Hydraulic flow from the pump to the hydrostatic motor is governed by the displacement of the hydrostatic pump and the speed at which the pump is driven by the engine. Typically, the engine also provides power to operate other components of the combine such as the header, threshing unit and unload tube conveyor and positioning unit. The power for driving these components is obtained by a power take-off from the engine or by hydraulic flow from the hydrostatic pump.

For reasons of fuel economy and to prevent overload of the components when they are being driven, the speed of the engine is limited so that only enough power to satisfy the requirements of the components is made available to them. This limits the maximum ground speed normally obtainable. When the engine speed is so limited, the maximum ground speed of the combine is less than one might desire when the combine is traveling along a roadway.

SUMMARY OF THE INVENTION

An object of the present invention is to provide an engine speed control system for a combine harvester, the control system avoiding power overload of harvester components and yielding fuel efficiency when harvesting a crop, and permitting higher engine speeds for propelling the harvester on a roadway.

Another object of the invention is to provide an engine speed control system for a combine harvester, the system being responsive to a manually actuated throttle control to cause the engine to run at either a first or work speed, or a second or road speed, for at least one setting of the throttle control, the road speed being greater than the work speed.

A further object of the invention is to provide an engine speed control system for a combine harvester, the system being responsive to a manually actuated multi-state throttle control to cause the engine to run at either a first or work speed or a second or road speed for each state of the throttle control, the road speed for each state of the throttle control being greater than the work speed for the same state of the throttle control.

Yet another object of the invention is to provide a combine harvester having wheels for propelling the combine harvester over the ground; an engine driving the wheels via a hydrostatic drive system; a manually operable throttle control including a lever selectively settable to any one of a plurality of positions, each position corresponding to a desired engine speed; a speed modification switch having a first state and a second state; and an engine control circuit for controlling the speed of said engine, the engine control circuit being responsive to the position of the throttle control lever and the speed modification switch for selectively controlling the engine to run at a first speed for a given position of the throttle control lever when the speed modification switch is in the first state and to run at a second speed higher than the first speed when the throttle control lever is in the given position and the speed modification switch is in the second state.

Another object of the invention is to provide a combine harvester as described above wherein the engine speed control circuit comprises a programmable microprocessor having means for storing a first table holding work speed values, one work speed value corresponding to each position of a throttle control lever, and a second table holding at least one road speed value greater than any of the work speed values; means for accessing a work speed value from the first table when a speed modification switch is in a first state and accessing a road speed value from the second table when the speed modification switch is in a second state; and means responsive to an accessed a work speed value or accessed road speed value for producing an output signal to control the engine to run at the speed represented by the accessed work speed or road speed value. The output signal from the microprocessor controls the engine speed by controlling the rate of fuel flow to the engine.

In a preferred embodiment, the table of road speed values includes a road speed value corresponding to each position of the throttle control lever, the road speed value corresponding to a given position of the throttle control lever being greater than the work speed value corresponding to the given position of the throttle control lever whereby, for each position of the throttle control lever, the engine may be selectively controlled to run at a first speed or a second speed higher than the first speed, depending on the state of the speed modification switch.

In addition to permitting a high range of road speeds, the invention also has the advantage that it permits a change in road speed without shifting gears.

Other objects and advantages of the invention will become obvious from consideration of the following description and the accompanying drawings.

DETAILED DESCRIPTION OF THE INVENTION

Figure 1:
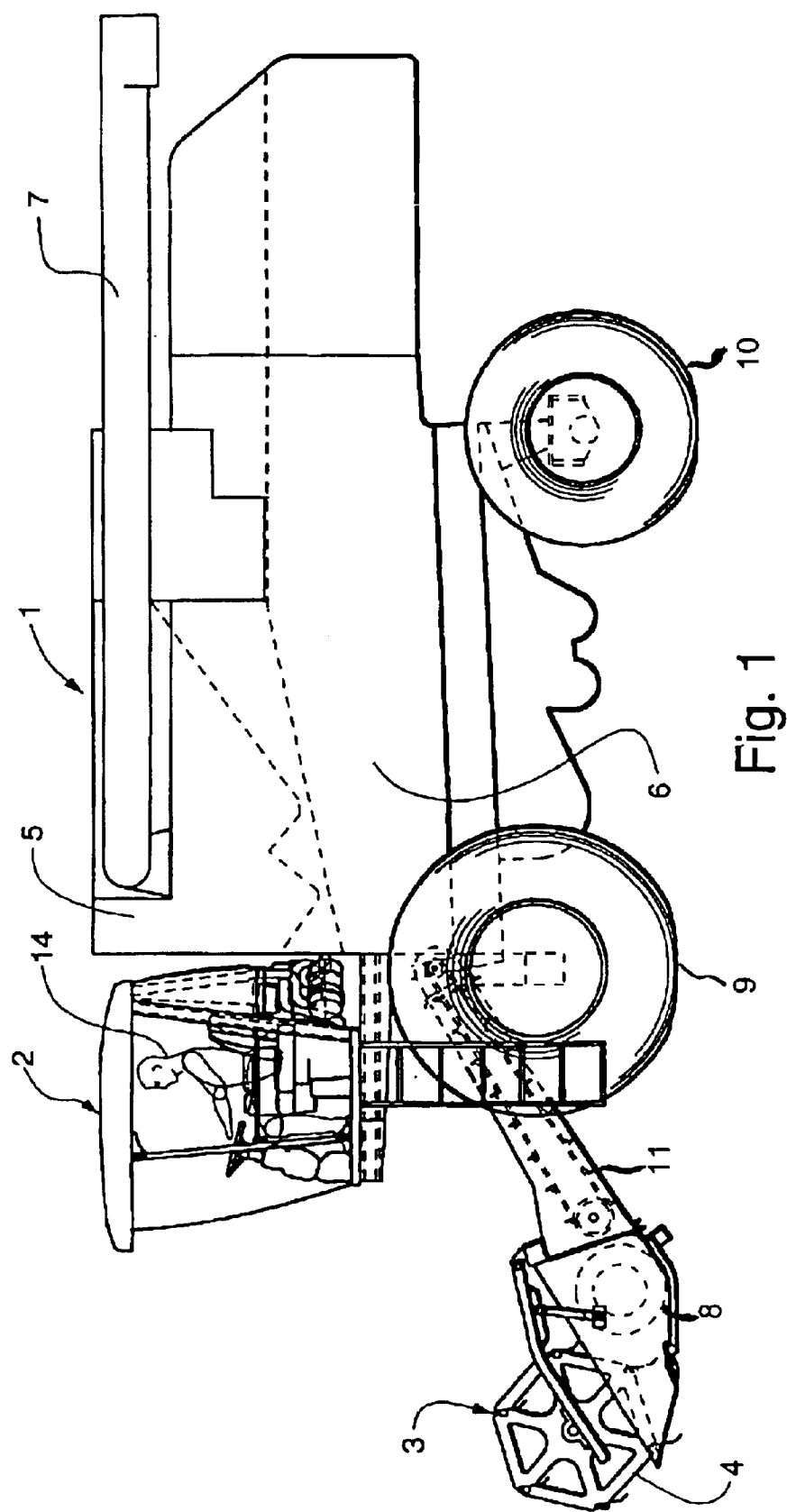
FIG. 1 is a side view of a combine harvester in which the present invention may be implemented.

FIG. 1 illustrates a typical twin rotor combine in which the present invention may be used. The combine 1 includes a header 3 having a reel 4 for cutting crop as the combine moves forwardly over a crop field. Crop material (grain and stalks) cut by reel 4 is fed to a transverse rotating auger 8 that moves the crop material toward the center of the header. From auger 8, the crop material is picked up by a conveyor 11 and fed to a threshing, separation and cleaning system 6 that separates the stalk material and chaff from the grain. The processed grain is stored in a grain tank 5 positioned near the top of the combine and the stalk material is discharged from the rear of the combine. The grain is removed from the grain tank by an unloading auger (not shown) through a grain tank unload tube 7. The unload tube 7 is pivotally mounted so that it may swing outwardly, thus permitting the discharge of processed grain into a truck or cart (not shown) moving along side the combine.

Figure 2:
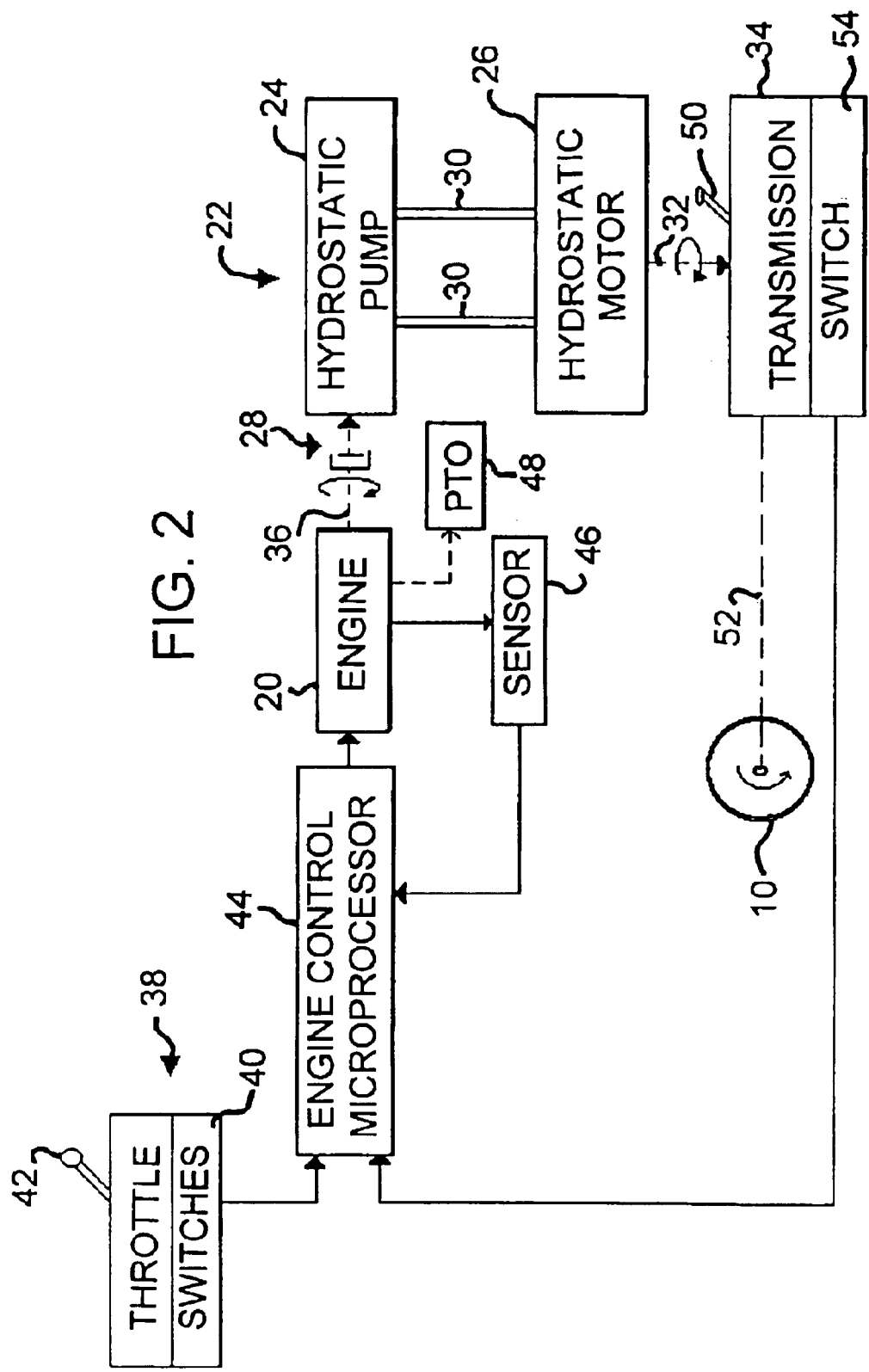
FIG. 2 schematically illustrates an engine speed control system for a combine, the engine driving wheels of the combine via a hydrostatic drive system; and, FIG. 3 is a flow chart illustrating a microprocessor program for setting the engine speed at either one of two speeds for each position of a throttle control lever.

Referring to FIG. 2, power for driving the wheels 10 of combine 1 is derived from an internal combustion engine 20. The engine drives a hydrostatic drive system 22 that includes a hydrostatic pump 24 and a hydrostatic motor 26. Engine 20 drives hydrostatic pump 24 via a fluid/mechanical coupling 28. The resulting fluid flow from pump 24 drives motor 26 via fluid conduits 30. As the motor 26 rotates, it drives the input shaft 32 of a transmission 34 that in turn transmits drive power to wheels 10.

The flow from pump 24 is determined by its displacement and input speed with the input speed being in direct ratio to the speed (rate of rotation) of the output shaft 36 of engine 20.

Operator 14 (FIG. 1) manually operates a throttle control 38 to select a speed at which engine 20 runs. The throttle control preferably includes a plurality of throttle control switches 40 operated by a lever 42 as it is set to one of several lever positions. However, the throttle control may take other forms such as a control panel having pushbuttons actuated by the operator to set the throttle control to one of multiple states. As explained below, the throttle control 38 does not determine the desired speed of engine 20 but merely selects a speed level within a first or second range of speed levels, the first or second range being determined by the positioning of a gear shift lever 50.

An engine control circuit or programmable microprocessor 44 periodically senses the state of the throttle control switches 40 and a switch 54 operated by the gear shift lever 50, and controls engine 20 to run at a desired speed. The microprocessor 44 also periodically samples the output of an engine speed sensor 46. As subsequently described microprocessor 44 compares the sensed or actual engine speed with the desired speed. If the sensed engine speed is less than the desired speed, the microprocessor 44 produces an output signal to increase the rate of fuel flow to the engine 20 to thereby increase its speed to the desired speed. Control of the rate of fuel flow is accomplished in a conventional manner, and may, for example, be done by controlling fuel injectors.

Engine 20, in addition to providing power to drive wheels 10, also provides power for actuating or driving other components of the combine such as the header 3, unload tube 7, and threshing, separation and cleaning system 6. The power for these components may be obtained directly from engine 20 via a power take-off (PTO) 48 and/or hydraulically from hydrostatic pump 24. Although the other components are not driven from the PTO during times when the combine is being transported, the engine speed, typically, has been selectable from a range of engine speeds that provide fuel economy and best accommodate the power and speed requirements of these components. These speeds result in ground speeds that are relatively slow, or at least slower than desired when the combine is being transported (driven) on a roadway or from one field to another.

Transmission 34 is provided with a gear select lever 50 for changing the gear ratio between the input shaft 32 and output shaft 52 of the transmission. In actual practice, and for reasons not relating to the present invention, lever 50 is movable between three active positions and a default position and in each position actuates a switch. However, to simplify explanation of the present invention it will be assumed that lever 50 is movable between only a HI position in which it closes a two-state speed modification switch 54 and a LO position in which switch 54 is open.

Switch 54 is connected to the microprocessor 44 and modifies the operation of the microprocessor program so that, for any given setting of throttle control switches 40, the engine 20 is controlled to run at a normal or work speed when the switch is in a first state (open), or a higher or road speed when the switch is in a second state (closed).

Figure 3:
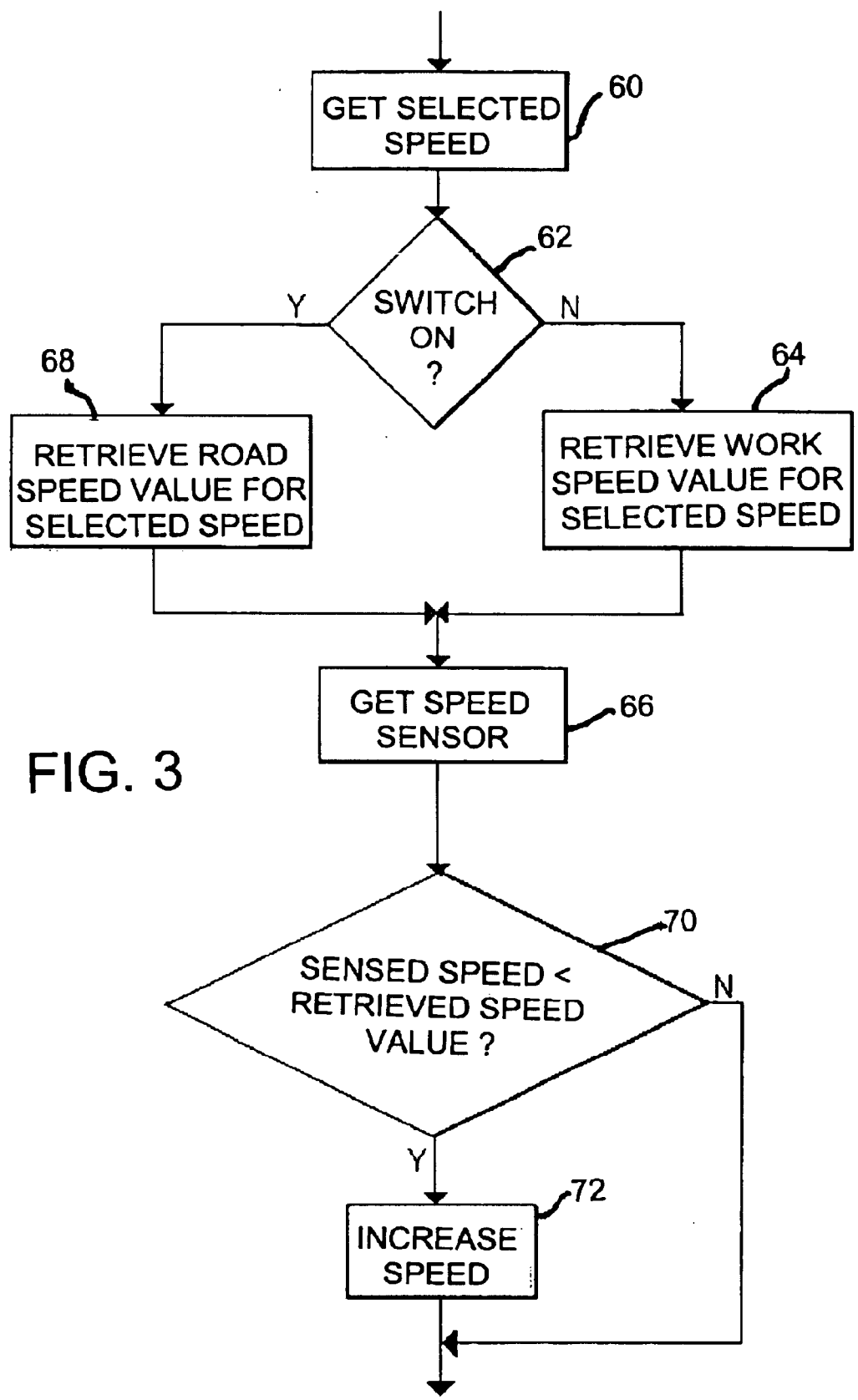

FIG. 3 shows a portion of the microprocessor program executed by engine control microprocessor 44 to set the speed of engine 20. It will be understood that the portion shown in FIG. 3 comprises part of a larger program that is periodically repeated at some time interval, say 32.77 ms.

At step 60 the microprocessor senses the throttle switches 40 to obtain an indication of what speed level has been selected by the operator via throttle lever 42. At step 62 the microprocessor senses the state of switch 54.

The microprocessor includes in a non-volatile memory (not separately shown) that stores two tables of speed values. A Work Speed table stores a work speed value corresponding to each position of the throttle lever 42. This table is accessed to obtain speed values for controlling engine 20 when working or harvesting a field.

The second table is a Road Speed table and it also holds a road speed value for each position of lever 42. The road speed values are used if switch 54 is closed to control the speed of the engine 20 during transport, that is, when the combine is traveling on a roadway or moving from one field to another. For any given position of lever 42, the speed value in the Road Speed table is greater than the speed value in the Work Speed table.

The speed values store in the Road Speed and Work Speed tables are digital values which, when converted to analog output signals by the microprocessor and applied to the fuel control of engine 20, cause the engine to run at the designated speeds.

If step 62 determines that speed modification switch 54 is not closed, the table of work speed values is accessed at step 64 using the throttle lever position sensed at step 60. That is, switch 54 serves as the base address of the Work Speed table and the output signal from the throttle switches 40 addresses a specific location in the table. On the other hand, when step 62 determines that the speed modification switch 54 is closed, the table of road speed values is accessed at step 68 using the lever position sensed at step 60.

After either a work speed or a road speed value is obtained, step 66 samples the output of sensor 46 to determine the current speed of engine 20. Step 70 then compares the sensed engine speed with the work speed value obtained from memory at step 64 or the road speed value obtained at step 68. If the sensed engine speed is less than the value obtained from memory, step 72 is executed to develop an output signal that is applied to the fuel control of engine 26 to cause the engine to increase speed to the speed value retrieved at step 64 or 68.

Step 72 is bypassed when step 70 determines that the sensed engine speed is not less than the value obtained from memory at step 64 or 68.

From the foregoing description it is evident that the present invention provides an inexpensive means for solving the problem of undesirably slow road speeds. The only additional hardware that is required is the switch 54. Advantageously, the invention permits an operator to change the ground speed of the combine without effecting a change in the gear ratio in the transmission 34. The ground speed may be changed merely by moving lever 42 so as to change the output signals produced by switches 40. It will also be evident that the system provides an instant response to load fluctuations in the field. Any change in engine speed is immediately sensed by sensor 46 and the microprocessor modifies it output signal to engine 20 to compensate for the change.

Although a preferred embodiment has been described in detail to illustrate the principles of the invention, various modifications are possible. For example, it is not necessary for the Road Speed table to hold road speed values corresponding to every position of lever 50. Instead, the Road Speed table may hold only one road speed value corresponding to one position (highest speed position) of the lever. In this case the program illustrated in FIG. 3 must be modified to provide, between steps 60 and 62, a further step for determining if the selected speed detected at step 60 is the highest speed. If it is not, the program would advance directly to step 64 but if the highest speed is selected then step 62 would be executed to determine the state of switch 54.

Other modifications and substitutions may be made in the described embodiment without departing from the spirit and scope of the invention as defined by the appended claims.

I claim:

1. A combine harvester, including a threshing, cleaning and separation system, having:

wheels for propelling the combine harvester over the ground;

an engine driving the wheels via a hydrostatic drive system of a transmission, wherein the transmission includes a gear select lever for changing a gear ratio of the transmission;

a speed modification switch having a first state and a second state, wherein movement of the gear select lever from a first position to a second position switches the speed modification switch from the first state to the second state and changes the gear ratio;

a manually operable throttle control switch having a plurality of positions, each position corresponding to a desired engine speed level; and an engine control circuit for controlling the speed of the engine, the engine control circuit being responsive to input from the throttle control switch and the speed modification switch for selectively controlling the engine to run at a first speed for a given position of the throttle control switch when the speed modification switch is in the first state, the first speed being selectable from a range of engine speeds that provide fuel economy and prevent power overload of the threshing, cleaning and separation systems during crop harvesting; the threshing, cleaning and separation systems obtaining their power from the engine, the engine control circuit being further responsive to input from the throttle control switch and the speed modification switch for controlling the engine to run at a second speed higher than the first speed when the throttle control switch is in the given position and the speed modification switch is in the second state, the engine control circuit providing additional power to permit higher engine speeds for propelling the combine harvester at the second speed higher than the first speed when the threshing, cleaning and separation systems are not operating, the additional power normally being used to power the threshing, cleaning and separation systems during crop harvesting, the engine control circuit comprising a programmable microprocessor connected to receive input from the throttle control switch and the speed modification switch, the programmable microprocessor comprising:

means for storing a first table holding work speed values, one work speed value corresponding to each position of the throttle control, and a second table holding at least one road speed value greater than any of the work speed values;

means for accessing a work speed value from the first table when the speed modification switch is in the first state and accessing a road speed value from the second table when the speed modification switch is in the second state; and, means responsive to an accessed work speed value or road speed value for producing an output signal to control the engine to run at the speed represented by the accessed work speed value or accessed road speed value.

2. A combine harvester as claimed in claim 1 wherein the table of road speed values includes a road speed value corresponding to each position of the throttle control, the road speed value corresponding to a given position of the throttle control being greater than the work speed value corresponding to the given position of the throttle control whereby, for each position of the throttle control, the engine may be selectively controlled to run at a first speed or a second speed higher than the first speed, depending on the state of the speed modification switch.

3. A combine harvester as claimed in claim 1 wherein the output signal controls the rate of fuel flow to the engine.

4. A combine harvester as claimed in claim 1, wherein the threshing, cleaning and separation system is powered by the engine, and the work speed values are chosen so the output power of the engine does not overload other harvester components to include the threshing, cleaning and separation system.

5. A combine harvester as claimed in claim 1, wherein the work speed values correspond to engine speed values when the combine harvester is operated to harvest a field, and the road speed values correspond to engine speed values when the combine harvester is operated to travel on a roadway.

* * * * *